United States Patent

Shin et al.

Patent Number: 5,588,054
Date of Patent: Dec. 24, 1996

[54] POWER CONSERVATION SYSTEM FOR A MODEM IN A COMPUTER SYSTEM

[75] Inventors: Seongkee Shin; Sangho Lee, both of Kyungki-do, Rep. of Korea

[73] Assignee: Samsung Electronics Co., Ltd., Suwon, Rep. of Korea

[21] Appl. No.: 425,530

[22] Filed: Apr. 20, 1995

[30] Foreign Application Priority Data

Oct. 27, 1994 [KR] Rep. of Korea .................. 94-27666

[51] Int. Cl.$^6$ .................................................. H04M 11/00
[52] U.S. Cl. ........................... 379/413; 379/93; 379/372
[58] Field of Search ............................. 379/93, 98, 413, 379/373, 375, 82, 372

[56] References Cited

U.S. PATENT DOCUMENTS

| | | | |
|---|---|---|---|
| 4,647,721 | 3/1987 | Busam et al. | 379/93 X |
| 4,653,088 | 3/1987 | Budd et al. | 379/413 X |
| 4,656,318 | 4/1987 | Noyes | 379/93 |
| 4,701,946 | 10/1987 | Oliva et al. | 379/93 X |
| 4,723,269 | 2/1988 | Summerlin | 379/102 |
| 4,907,254 | 3/1990 | Suzuki et al. | 379/93 |
| 4,951,309 | 8/1990 | Gross et al. | 379/98 |
| 4,961,220 | 10/1990 | Tentler et al. | 379/413 |
| 4,996,706 | 2/1991 | Cho | 379/93 |
| 5,003,578 | 3/1991 | Lin | 379/100 X |
| 5,381,472 | 1/1995 | Kobayashi et al. | 379/413 X |
| 5,392,023 | 2/1995 | D'Avello et al. | 379/100 X |
| 5,410,713 | 4/1995 | White et al. | 395/750 |
| 5,491,721 | 2/1996 | Cornelius et al. | 379/93 X |

FOREIGN PATENT DOCUMENTS

| | | |
|---|---|---|
| 948840 | 4/1994 | Rep. of Korea . |
| 948841 | 4/1994 | Rep. of Korea . |

OTHER PUBLICATIONS

MacBride et al., "Remote Computer Power–On Via Switched Telephone Network", IBM Technical Disclosure Bulletin, vol. 25, No. 6, Nov. 1982. p. 3064.

*Primary Examiner*—Krista M. Zele
*Assistant Examiner*—Devendra Kumar
*Attorney, Agent, or Firm*—Cushman Darby & Cushman, L.L.P.

[57] ABSTRACT

A power conservation system for a modem in a computer system having a primary power supply and an auxiliary power supply, including a ring detect circuit coupled to a telephone ring signal line for generating a ring detect signal in response to detection of a ring signal on the telephone ring signal line, a power management system having an input coupled to the ring detect circuit and an output coupled to the primary power supply, the power management system being responsive to the ring detect signal for switching the primary power supply from a first level corresponding to a power conservation mode of operation of the computer system to a second level corresponding to a normal mode of operation, wherein the auxiliary power supply is coupled to the ring detect circuit for supplying power thereto when the computer system is in the power conservation mode of operation, whereby the ring detect circuit is maintained in an active state even during the power conservation mode of operation of the computer system.

21 Claims, 3 Drawing Sheets

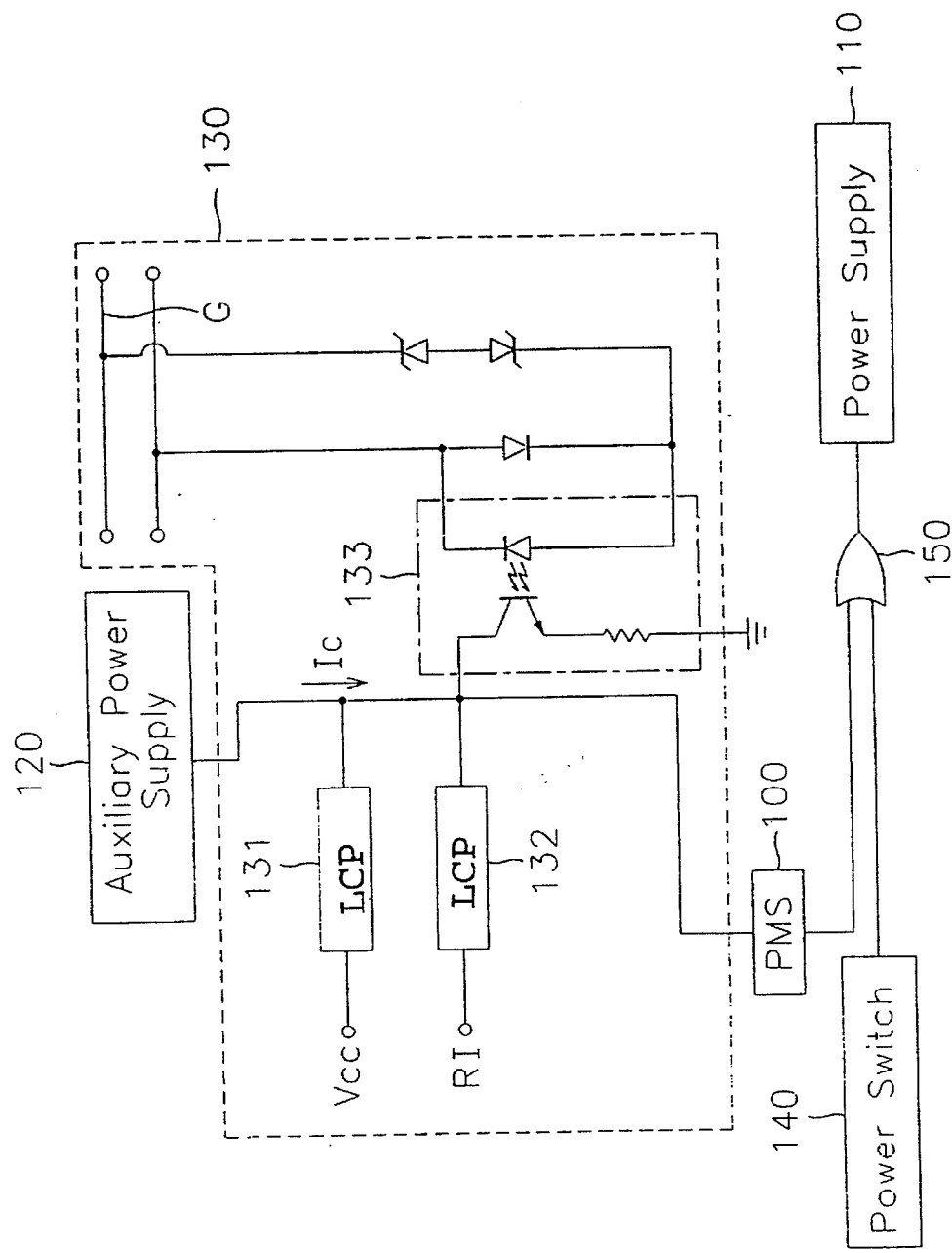

POWER CONSERVATION SYSTEM FOR A MODEM IN A COMPUTER SYSTEM

BACKGROUND OF THE INVENTION

1. Field of the Invention

The present invention relates generally to modems, and, more particularly, to a power conservation system for a modem in a computer system.

2. Description of the Related Art

Contemporary computer systems have a power saving or conservation feature which is automatically invoked when the computer is idle (not used) for a predetermined period of time. In a power conservation mode of operation, the computer is supplied with a minimum amount of power. Some computer systems have a hierarchy of different power conservation modes, e.g., idle, standby, and sleep modes of operation, which utilize a different amount of power, respectively. When use of the computer is resumed from a power conservation mode, the normal power supply is re-established. Modems (modulator/demodulator) utilized in such computer systems also have a power-saving function for minimizing power consumption.

With reference now to FIG. 1, there can be seen a block diagram of a conventional computer system having a power conservation feature. In general, the computer system includes a monitor 50, a main body 1, and a keyboard 2. The main body 1 includes a central processing unit (CPU) 20, a memory 30, a video logic module 40, a timer 60, a direct memory access (DMA) and interrupt controller 70, an expansion slot (or port) 80, a modem 10 coupled to the expansion slot 80, storage media 90 (e.g., a floppy disk drive and/or a hard disk drive and/or a CD-ROM drive), a power supply 110, an auxiliary power supply 120 (e.g., a secondary battery), and a power management system 100 for controlling the power supply 110 and the auxiliary power supply 120.

With additional reference now to FIG. 2, there can be seen a schematic diagram of the ring detect circuit of the conventional modem 10 having a power-saving function. The ring detect circuit includes a photocoupler 11 having an input terminal connected to ring signal lines G of a telephone line pair, and a phototransistor having a collector terminal connected to power voltage Vcc supplied through the expansion slot 80, an emitter terminal coupled to ground through a resistor, and a base terminal photocoupled to a light emitting diode (LED). An output terminal RI of the ring detect circuit is coupled to an output node disposed between the power supply Vcc and the collector terminal of the phototransistor of the photocoupler 11.

The ring detect circuit operates as follows. More particularly, when a ring signal is present on the ring signal line G, (e.g., when an incoming call is received), it is converted by the LED into an optical signal which is coupled to the phototransistor, which, in turn, converts it back into an electrical signal which is applied as an output ring detect signal to the output terminal RI. The photocoupler 11 thus minimizes the noise level of the ring detect signal by eliminating noise inherent in the ring signal applied over the ring signal line G. When the keyboard 2 is not used (i.e., data is not keyed in or inputted) for a predetermined period of time, the power management system (PMS) 100 switches the power supply 110 and the auxiliary power supply 120 from a normal (active) mode to a power conservation mode of operation in which a minimum amount of power is supplied thereby to the main body 1, and cuts off power to the rest of the computer system, including the modem 10. When the power supply to the modem 10 is cut off, the operation of the ring detect circuit 10 is discontinued, thereby minimizing power consumption. However, this conventional modem 10 suffers a major disadvantage, in that no incoming data can be received via the modem 10 while it is in the power conservation mode. In this regard, the modem 10 should ideally be in a standby mode at all times.

Korean Utility Model Unexamined Application Publication Nos. 94-8840 and -8841 (published on Apr. 21, 1994) propose a "Facsimile and Modem Having a Built-in Computer with a Power Controller of Telephone Incoming and Receiving Type", and "Telephone Operated Only to Facsimile and Modem", respectively, to overcome the above-described disadvantage of the conventional modem 10.

The 8840-41 publications disclose an integrated (unitary) fax/modem having a built-in computer and power controller, which utilizes a mechanical or electronic switch responsive to a detection signal produced by a current or voltage sensor which is indicative of unused, incoming call, and outgoing call states of the fax/modem. Thus, whether manned or unmanned, the telephone communication link of the fax/modem is not interrupted, since a current or voltage sensor is utilized which is not dependent upon an external power supply which is cut off during a power conservation mode of operation, rather than, as in the conventional modem 10, utilizing a photocoupler 11 which depends upon a power supply Vcc which is cut off during a power conservation mode of operation.

Although the above-described integrated fax/modem disclosed in the 8840-41 publications overcomes the major disadvantage of the conventional modem 10, it has other drawbacks and shortcomings. Namely, since the computer must always be in a standby mode of operation to perform the power control operation described above, it requires an external auxiliary adapter, which increases power management overhead and power consumption.

Based on the above and foregoing, it can be appreciated that there presently exists a need in the art for a power conservation system for a modem in a computer system which overcomes the above-described disadvantages, drawbacks, and shortcomings of presently available systems. The present invention fulfills this need.

SUMMARY OF THE INVENTION

The present invention encompasses a power conservation system for a modem in a computer system having a primary power supply and an auxiliary power supply, including a ring detect circuit coupled to a telephone ring signal line for generating a ring detect signal in response to the detection of a ring signal on the telephone ring signal line, a power management system having an input coupled to the ring detect circuit and an output coupled to the primary power supply, the power management system being responsive to the ring detect signal for switching the primary power supply from a first level corresponding to a power conservation mode of operation of the computer system to a second level corresponding to a normal mode of operation, wherein the auxiliary power supply is coupled to the ring detect circuit for supplying power thereto when the computer system is in the power conservation mode of operation, whereby the ring detect circuit is maintained in an active state even during the power conservation mode of operation of the computer system.

BRIEF DESCRIPTION OF THE DRAWINGS

These and various other features and advantages of the present invention will be readily understood with reference

FIG. 3 is a partial schematic, partial block diagram of a power conservation system for a modem constructed in accordance with a preferred embodiment of the present invention.

DETAILED DESCRIPTION OF THE INVENTION

Figure 1:
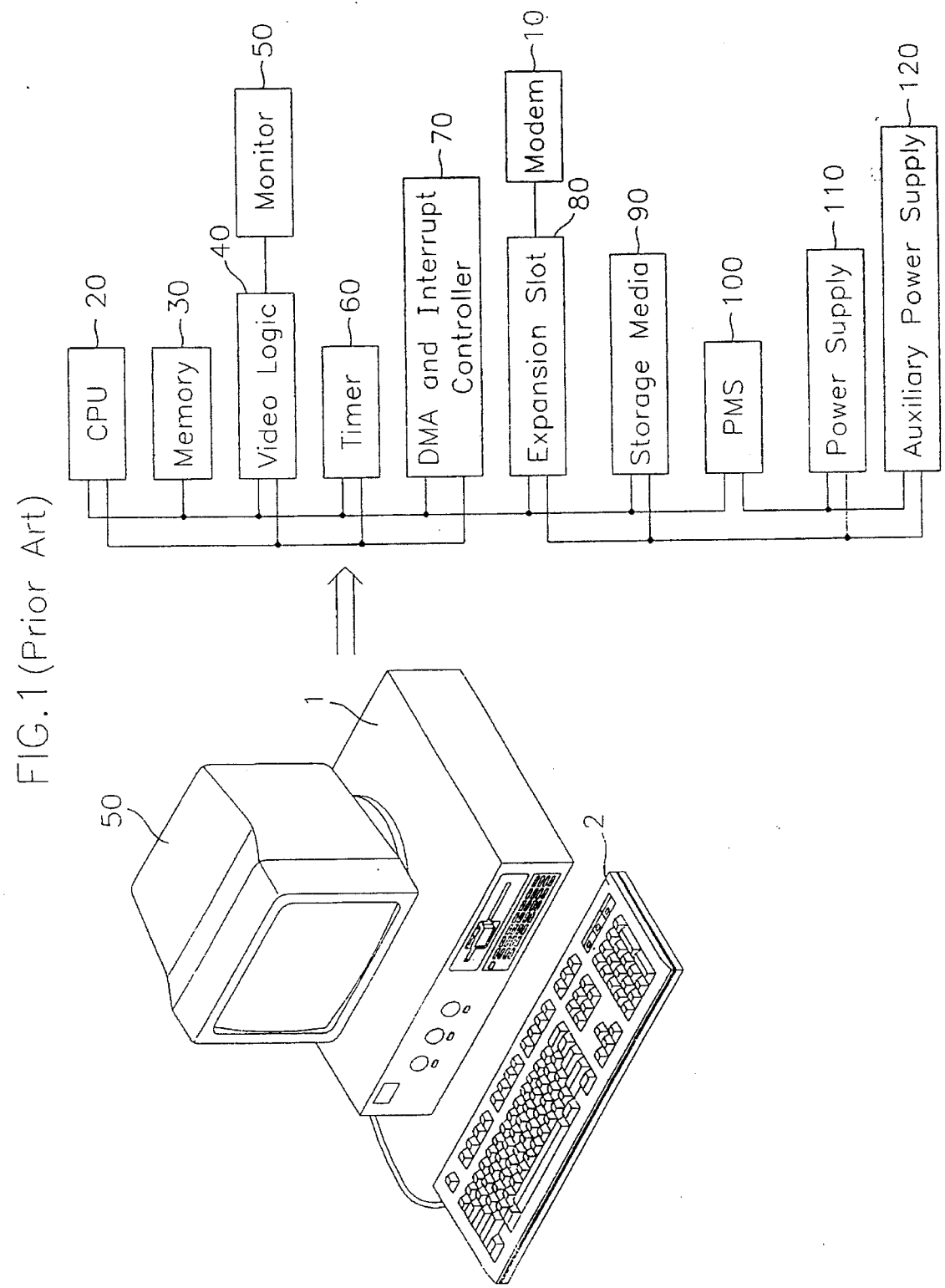
FIG. 1 is a diagrammatical view of a conventional computer system.
Figure 2:
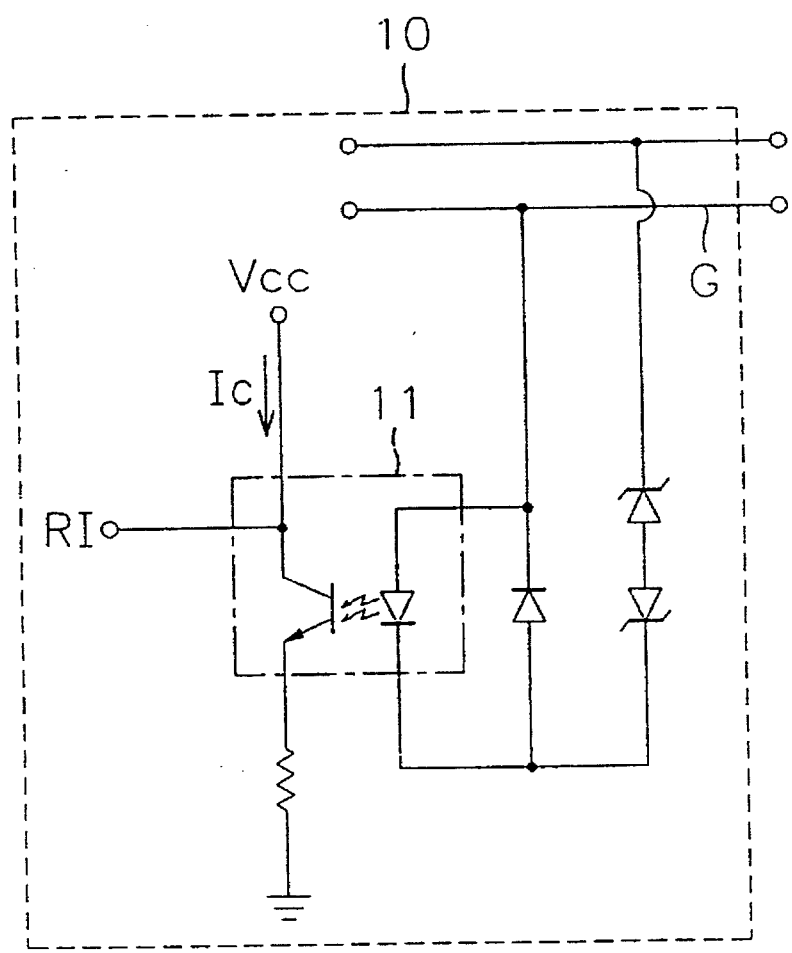
FIG. 2 is a schematic diagram of the modem of the conventional computer system depicted in FIG. 1.

With reference now to FIGS. 1 and 3, a preferred embodiment of the present invention will now be described. In this connection, the computer system in which the present invention is utilized can suitably be like the conventional one depicted in FIG. 1, and, for illustrative purposes, will be described in connection therewith, with like parts being referred to in FIGS. 1 and 3 with the same reference numerals. The present invention includes a modem 130, a power switch 140 (which can be turned "ON" or "OFF" by a user), a power management system (PMS) 100, a power supply 110, a logical OR gate 150, and an auxiliary power supply 120. The modem 130 includes a conventional ring detect circuit like that depicted in FIG. 2, including a photocoupler 133 coupled to the ring signal lines G of a telephone line pair. However, unlike the conventional ring detect circuit, the collector terminal of the phototransistor of the photocoupler 133 of the ring detect circuit of the modem 130 of the present invention is coupled to the auxiliary power supply 120. Further, the collector terminal of the phototransistor of the photocoupler 133 is coupled via a first leakage current protector (LCP) 131 (e.g., a diode) to power supply voltage Vcc, and via a second leakage current protector (LCP) 132 (e.g., a diode) to an output terminal RI.

The operation of the power conservation system of the present invention will now be described. More particularly, when the power supply voltage Vcc is applied, e.g., via an expansion slot 80 of the computer system, the modem 130 is activated for receiving/sending data, in a normal mode of operation. In this normal mode of operation, when a ring signal is applied on the ring signal lines G (e.g., when an incoming call is received), the photocoupler 133 converts the ring signal into an optical signal and then back into a relatively noiseless electrical ring detect signal, in the conventional manner.

When the keyboard 2 of the computer system is not used (i.e., data is not keyed in or inputted) for a predetermined period of time, the power management system (PMS) 100 switches the power supply 110 from the normal (active) mode of operation to a power conservation mode of operation, in which a minimum amount of power is supplied thereby to the main body 1, and the power supply Vcc from the expansion slot 80 to the modem 130 is cut off.

However, although the power supply 110 is switched to a lower (power saving) level, and the power supply Vcc is cut off, the auxiliary power supply 120 continuously supplies power to the ring detect circuit of the modem 130. Therefore, even when the computer system is in a power conservation mode of operation, the ring detect circuit of the modem 130 is activated. As such, when a ring signal is applied to the ring signal lines G (e.g., when an incoming call is received), the ring detect circuit is responsive thereto for generating the ring detect signal, which is coupled to the power management system (PMS) 100, which can suitably be implemented in the form of a chip set. The output of the PMS 100 is applied as a first input to the OR gate 150. In response to the ring detect signal, the output of the PMS 100 is driven to an active logic state (e.g., "high"), thus causing the output of the OR gate to go "high". The power supply 110, in response to the output of the OR gate going "high", is automatically switched from its low (power saving) level to its normal level, whereby the computer system is thereby automatically switched from the power conservation mode of operation back to the normal mode of operation.

Although a presently preferred embodiment of the present invention has been described in detail hereinabove, it should be clearly understood that many variations and/or modifications which may appear to those skilled in the art will still fall within the spirit and scope of the present invention as defined in the appended claims.

What is claimed is:

1. A power conservation system for a modem in a computer system having a primary power supply and an auxiliary power supply, comprising:

a ring detect circuit coupled to a telephone ring signal line for generating a ring detect signal in response to detection of a ring signal on said telephone ring signal line, said ring detect circuit also being coupled to a power supply voltage for supplying power to said ring detect circuit during a normal mode of operation;

a power management system having an input coupled to said ring detect circuit and an output coupled to the primary power supply, said power management system being responsive to said ring detect signal for switching the primary power supply from a first level corresponding to a power conservation mode of operation of the computer system to a second level corresponding to said normal mode of operation; and, wherein said auxiliary power supply is coupled to said ring detect circuit for supplying power to said ring detect circuit when the computer system is in said power conservation mode of operation, whereby said ring detect circuit is maintained in an active state even during said power conservation mode of operation of the computer system.

2. The system as set forth in claim 1, wherein said power management system automatically switches the computer system from said normal mode of operation to said power conservation mode of operation when a keyboard of the computer system has been inactive for a predetermined period of time.

3. The system as set forth in claim 1, wherein said power management system automatically cuts off said power supply voltage from said ring detect circuit during said power conservation mode of operation.

4. The system as set forth in claim 3, further comprising:

a first leakage current protector connected between said power supply voltage and an output node of said ring detect circuit; and, a second leakage current protector connected between a ring detect signal output terminal and said output node of said ring detect circuit.

5. The system as set forth in claim 4, wherein said first and second leakage current protectors each comprise a diode.

6. The system as set forth in claim 1, further comprising:

a power switch having manually selectable on and off states; and, a logic gate having a first input coupled to an output of said power switch, a second input coupled to an output of said power management system, and an output coupled to the primary power supply.

7. The system as set forth in claim 6, wherein said logic gate comprises a logical OR gate.

8. The system as set forth in claim 4, further comprising:

a power switch having manually selectable on and off states; and, a logic gate having a first input coupled to an output of said power switch, a second input coupled to an output of said power management system, and an output coupled to the primary power supply.

9. The system as set forth in claim 8, wherein said logic gate comprises a logical OR gate.

10. The system as set forth in claim 1, wherein said auxiliary power supply continuously supplies power to said ring detect circuit during both said normal and power conservation modes of operation.

11. The system as set forth in claim 1, wherein said auxiliary power supply comprises a battery power source.

12. The system as set forth in claim 4, wherein said auxiliary power supply continuously supplies power to said ring detect circuit during both said normal and power conservation modes of operation.

13. The system as set forth in claim 1, wherein said ring detect circuit includes a photocoupler coupled between said telephone line and an output node of said ring detect circuit.

14. The system as set forth in claim 2, wherein said power supply voltage is supplied via an expansion port of the computer system.

15. A power conservation system for a modem in a computer system having a primary power supply and an auxiliary power supply, comprising:

ring detect means coupled to a telephone ring signal line for generating a ring detect signal in response to detection of a ring signal on said telephone ring signal line, said ring detect means also being coupled to a power supply voltage to supply power to said ring detect means during a normal mode of operation;

power management means having an input coupled to said ring detect means and an output coupled to the primary power supply, said power management means being responsive to said ring detect signal for switching the primary power supply from a first level corresponding to a power conservation mode of operation of the computer system to a second level corresponding to said normal mode of operation; and, wherein said auxiliary power supply is coupled to said ring detect means for supplying power to said ring detect means when the computer system is in said power conservation mode of operation, whereby said ring detect circuit is maintained in an active state even during said power conservation mode of operation of the computer system.

16. The system as set forth in claim 15, wherein said power management means automatically switches the computer system from said normal mode of operation to said power conservation mode of operation when a keyboard of the computer system has been inactive for a predetermined period of time.

17. The system as set forth in claim 15, wherein said power management means automatically cuts off said power supply voltage from said ring detect means during said power conservation mode of operation.

18. The system as set forth in claim 15, further comprising:

a power switch having manually selectable on and off states; and, a logic gate having a first input coupled to an output of said power switch, a second input coupled to an output of said power management means, and an output coupled to the primary power supply.

19. A power conservation system for a modem in a computer system, comprising:

a primary power supply;

an auxiliary power supply comprising a battery;

a ring detect circuit coupled to a telephone ring signal line for generating a ring detect signal in response to detection of a ring signal on said telephone ring signal line; and a power management system having an input coupled to said ring detect circuit and an output coupled to the primary power supply, said power management system being responsive to said ring detect signal for switching the primary power supply from a first level corresponding to a power conservation mode of operation of the computer system to a second level corresponding to said normal mode of operation, said auxiliary power supply being coupled to said ring detect circuit for supplying power to said ring detect circuit when the computer system is in said power conservation mode of operation, whereby said ring detect circuit is maintained in an active state even during said power conservation mode of operation of the computer system.

20. The system as set forth in claim 19, wherein said ring detect circuit is also coupled to a power supply voltage for supplying power to said ring detect circuit during a normal mode of operation.

21. The system as set forth in claim 19, wherein said auxiliary power supply continuously supplies power to said ring detect circuit during both said normal and power conservation modes of operation.

\* \* \* \* \*